United States Patent [11] 3,608,983

| [72] | Inventor | Adolf Steiner Gerlingen-Waldstadt, Germany |
|---|---|---|
| [21] | Appl. No. | 835,653 |
| [22] | Filed | June 23, 1969 |
| [45] | Patented | Sept. 28, 1971 |
| [73] | Assignee | Daimler-Benz Aktiengesellschaft Stuttgart-Unterturkheim, Germany |
| [32] | Priority | June 22, 1968 |
| [33] | | Germany |
| [31] | | P 17 55 791.4 |

[54] INSTALLATION FOR PREVENTING THE LOCKING OF ONE OR SEVERAL WHEELS OF A VEHICLE DURING THE BRAKING
3 Claims, 7 Drawing Figs.
[52] U.S. Cl. .................................................... 303/21 CG, 188/181 A, 303/20, 324/162, 340/262
[51] Int. Cl. ....................................................... B60t 8/16
[50] Field of Search............................................ 188/181 A; 303/21 A, 21 P, 21 BB, 21 EB, 21 F, 20, 21 CG; 324/70, 160, 161, 162; 340/268, 262; 73/507, 518

[56] References Cited
UNITED STATES PATENTS

| 3,017,145 | 1/1962 | Yarber | 303/21 A |
| 3,086,157 | 4/1963 | Branco | 324/69 |
| 3,245,213 | 4/1966 | Thompson et al. | 303/21 |
| 3,282,037 | 11/1966 | Barnett et al. | 324/69 |
| 3,469,662 | 9/1969 | Dewar | 303/21 |
| 3,503,654 | 3/1970 | Stamm | 303/21 |
| 3,511,542 | 5/1970 | Fielek, Jr. | 188/181 A |
| 3,512,844 | 5/1970 | Stelzer | 303/21 F |

Primary Examiner—Milton Buchler
Assistant Examiner—Stephen G. Kunin
Attorney—Craig, Antonelli, Stewart & Hill ABSTRACT: An installation for preventing locking of one or several wheels of a motor vehicle during braking in which the locking of a wheel is sensed magnetically producing a signal which is used as an input to a control unit controlling the reduction of the pressure medium in the brake line leading to the wheel starting to lock. U-shaped magnets are arranged in a magnetic wheel in such a manner that the alternating succeeding poles correspond to the tooth pitch of the brakedrum. A rotary mass is coupled with the magnetic wheel such that it leads the magnetic wheel during locking of the wheel and thereby actuates a switch provided in the switching installation and connected with a valve.

PATENTED SEP 28 1971  3,608,983

INVENTOR
ADOLF STEINER

BY
Craig, Antonelli, Stewart & Hill

ATTORNEYS

INVENTOR
ADOLF STEINER

BY

ATTORNEYS

INSTALLATION FOR PREVENTING THE LOCKING OF ONE OR SEVERAL WHEELS OF A VEHICLE DURING THE BRAKING

The present invention relates to an installation for preventing the locking of one or several wheels of a vehicle during the braking, consisting of a shifting or switching arrangement controlled by the wheel, preferably by the brake drum or brake disk which during the blocking of a wheel, actuates a valve that reduces the pressure of the working medium tightening the brake.

With known constructions of installations of this type, the installation controlled by the brake drum or brake disk consists of an inert rotating mass, rotating proportionally to the wheel or directly with the wheel, which during the locking of the wheel leads the same and thereby closes the valve. This rotating mass, the so-called sensor, is located in direct proximity to the brake drum or brake disk and is driven, for example, by way of a friction wheel transmission. By reason of the strong soiling of the brake drum in connection with commercial-type vehicles, particularly during use in cross country drives, such a type of drive is exposed to high wear and additionally cannot assure an adequate operational reliability.

The present invention aims at avoiding these disadvantages. The present invention essentially consists in that the pickup of the switching installation takes place magnetically at the wheel. As a result of such a construction, the pickup for the switching installation at the wheel takes place neither from locking nor force lockingly so that soiling has no great influence and wear appearances are avoided. The wheel may thereby be equipped advantageously with a toothed arrangement provided preferably at the brake drum whose tooth pitch corresponds to the distance between the poles of one of several magnets which are arranged at a distance to the brake drum and are connected with the switching or shifting installation.

Advantageously, in a simple type of construction of the present invention, U-shaped magnets may be arranged in a magnetic wheel in such a manner that the alternately succeeding poles correspond to the tooth pitch of the brake drum. A rotating mass may thereby be coupled with the magnetic wheel which is supported in a conventional, known manner such that it leads or precedes the magnetic wheel during locking of the wheel and thereby actuates a switch provided in the switching installation and connected with a valve.

In order to preclude wear appearances to an even greater extent, according to a further development of the inventive concept rotating parts may be dispensed with altogether in the installation if a fixedly arranged magnet is provided that includes a coil or winding in which, during the rotation of the wheel and of the teeth, a voltage is induced whose frequency serves as measuring magnitude of a conventional electronic control unit of the valve. Appropriately a fixedly arranged U-shaped magnet may be utilized thereby as pulse transmitter for the electronic control unit. The frequency of the induced voltage corresponds thereby to the rotational speed of the wheel or also to a predetermined brake deceleration. Advantageously the frequency corresponding to the maximum possible brake deceleration of the brake installation may be stored conventionally in an electronic control unit as comparison base for the logic decisions thereof.

The electronic control unit may, during the blocking, produce a current for a magnetic valve connected to the control unit. The valve controlling the pressure of the brake medium may include a conventional delay member of any suitable, known construction which controls the rerise of the pressure of the brake medium according to a time function.

Accordingly, it is an object of the present invention to provide an installation for preventing the locking of one of several wheels of a vehicle during braking which avoids by simple means the aforementioned shortcomings and drawbacks encountered in the prior art.

Another object of the present invention resides in an installation for preventing the locking of one of several wheels of a motor vehicle during braking thereof which minimizes wear appearances and increases the reliability in operation.

A further object of the present invention resides in an installation for preventing the locking of a wheel of the type described above which is simple in construction relatively inexpensive in manufacture and easy to install into a vehicle.

These and further objects, features, and advantages of the present invention will become more obvious from the following description when taken in connection with the accompanying drawing which shows, for purposes of illustration only, two embodiments in accordance with the present invention, and wherein.

Figure 1:
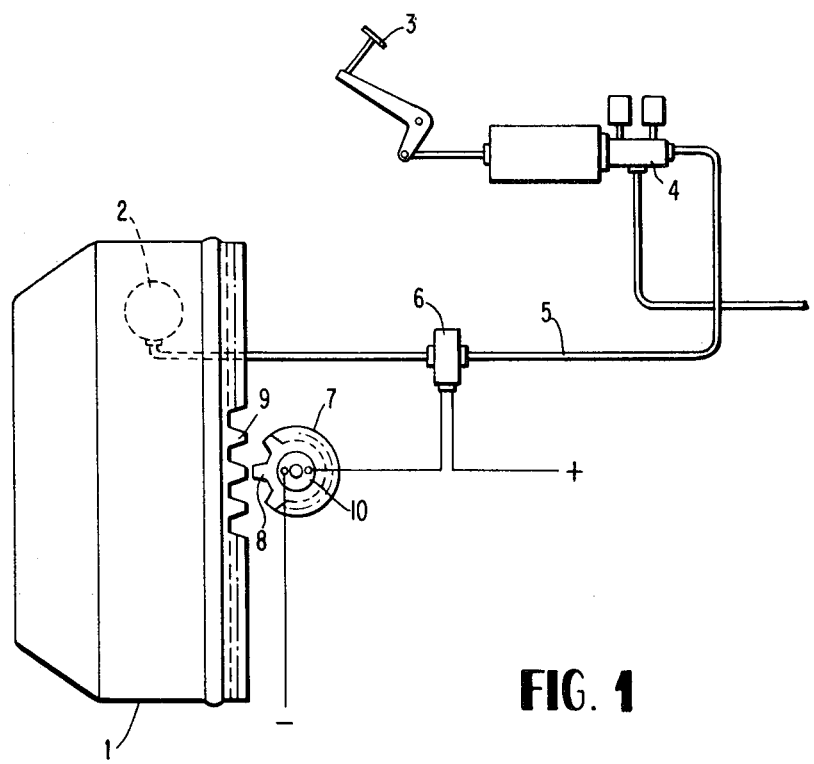
FIG. 1 is a schematic view of one embodiment of an installation in accordance with the present invention with a magnetic wheel for the front wheel of a motor vehicle.

Referring now to the drawing wherein like references numerals are used throughout the various views to designate like parts, and more particularly to FIG. 1, reference numeral 1 designates in this figure the brake drum of a front wheel of a motor vehicle. This brake drum 1 is hydraulically actuated by means of a wheel brake cylinder 2 from a pedal 3 and the master brake cylinder 4. A magnetic valve 6 is arranged in the hydraulic brake line 5 between the master brake cylinder 4 and the wheel brake cylinder 2 which upon actuation reduces the pressure in the brake line. The reduction of the pressure is to take place during blocking or locking of the wheel.

Figure 2:
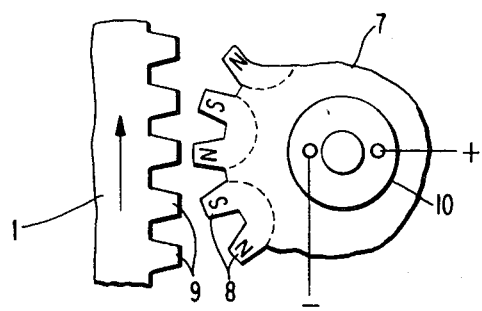
FIG. 2 is a partial view, on an enlarged scale, illustrating a detail of FIG. 1.

In order to determine the locking of the wheel, magnetic wheel 7 is provided which is equipped with several circumferentially distributed, U-shaped magnets 8 having the legs thereof directed radially outwardly which are so arranged that the north and south poles N and S arranged at a distance to one another produce a uniform tooth pitch. As illustrated in FIG. 2, the brake drum 1 is also provided with a toothed arrangement 9 whose pitch corresponds to the pole spacing of the magnetic wheel 7. As a result of this arrangement, a coordination of tooth to tooth and gap to gap is established at the brake drum 1 and the magnet wheel 7 by the lines of force of the magnets 8 which remains preserved also during the drive. The magnetic wheel 7 rotates proportional to the rotational speed of the wheel.

The magnetic wheel 7 is arranged on the shaft of a rotating mass 10, the so-called sensor, and is coupled thereto in any conventional manner. With excessive changes in rotational speed of the wheel i.e., during locking, the rotational speed of the magnet 7 is strongly reduced in the same measure or to the same extent whereas the inertia mass of the sensor 10 leads the magnet wheel 7. The sensor 10 thereby conventionally closes a contact (not shown) and shifts the magnetic valve 6 arranged in the brake line 5. The magnetic valve 6 reduces the pressure of the working medium tightening the brake of the wheel to such an extend that the wheel under the given adherence conditions again accelerates.

After realized acceleration, the pressure rise of the working medium starts after a predetermined time function up to the value adjusted by the driver. If the wheel should again lock then the operation described above repeats itself.

Figure 3:
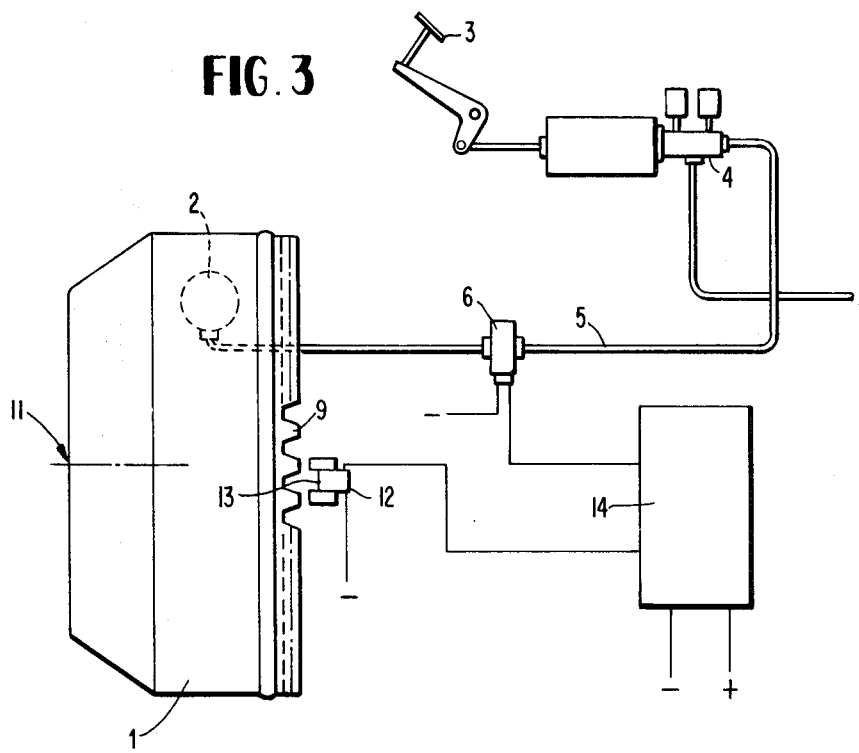
FIG. 3 is a schematic view of a further embodiment of an installation in accordance with the present invention equipped with a pulse transmitter.
Figure 4:
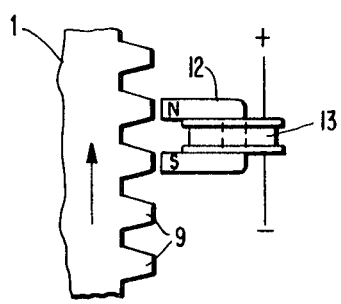
FIG. 4 is a partial view, on an enlarged scale, of a detail of FIG. 3.

The embodiment shown in FIGS. 3 and 4 also illustrates an arrangement for preventing the locking of a front wheel 11 of a motor vehicle. Also in this embodiment, the brake arranged on the inside of the brake drum is actuated by way of a wheel brake cylinder 2 which is connected by way of a brake line 5 with the master brake cylinder 4 actuated by a pedal 3. An electromagnetic shifting valve 6 is also arranged in the brake line 5 which during blocking of the wheel 11, relieves the pressure of the working medium and thereby disengages the brake.

Figure 5:
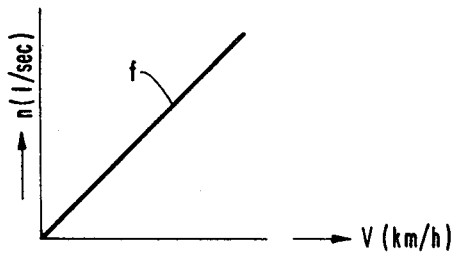
FIG. 5 is a diagram illustrating the frequency of the pulse transmitter in dependence on the vehicle velocity and the wheel rotational speed.

The brake drum 1 is, as in the embodiment of FIG. 1, provided with an axial, inwardly directed toothed arrangement 9 which, however, is disposed at a distance opposite a U-shaped, fixedly arranged magnet 12. Since also in this case the tooth pitch of the teeth 9 of the brake drum 1 corresponds to the spacing of the north and south poles N and S of the magnet 12, two teeth each of the brake drum 1 form in the illustrated position a magnetic bridge between the north and the south poles N and S of the magnet 12 so that in that case a maximum for the magnetic flow results. If the drum 1 rotates further by one-half a tooth pitch, then the magnetic flux undergoes its minimum. The U-shaped magnet 12 is provided with a winding 13 in which, with a rotating brake drum 1, a sinusoidally shaped voltage is produced by reason of the changes in magnetic flux shows frequency (FIG. 5) is proportional to the rotational speed of the wheel 11. The thus-produced electric voltage is fed to an electronic control unit 14 of any conventional, known construction for which the frequency serves as measuring quantity. The U-shaped magnet 12 is utilized as pulse transmitter for the electronic control unit 14. Since the control unit 14 is known as such and forms no part of the present invention, a detailed description thereof is dispensed with herein.

Figure 6:
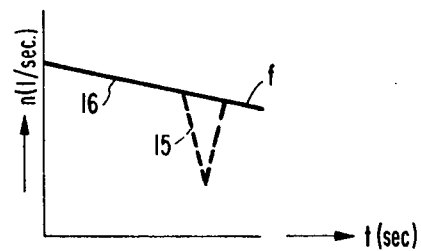
FIG. 6 is a diagram illustrating the relationship of frequency to brake deceleration.

The pulse frequency changes with the deceleration of the wheel 11 as a result of a braking action. For example, the frequency may change with time in the manner illustrated in FIG. 6. An accurately predetermined curve of the pulse frequency versus time is coordinated to the maximum possible deceleration of a brake installation of a vehicle (FIG. 6). This maximum possible, timely pulse frequency change is stored conventionally in the electronic control unit 14 and serves as comparison base for the logic decisions thereof.

Figure 7:
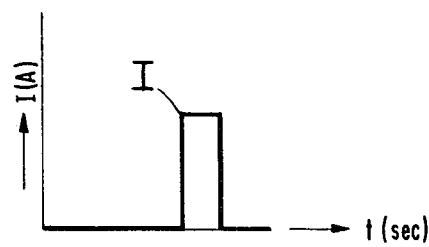
FIG. 7 is a diagram illustrating control current as a function of brake deceleration.

If during a braking operation the pulse frequency deviates strongly by reason of locking (portion 15 of curve 16 indicated in sash line of FIG. 6), then the electron control unit 14 transmits a control current I (FIG. 7) to the electromagnetic shifting valve 6 that had been energized previously which actuates the valve 6 into its control position in which the pressure in the brake line 5 of a respective wheel 11 is reduced and the locking is prevented. After the decrease of the pressure the controlled wheel 11 again accelerates whereby, as a result of the positive frequency change, the electronic control unit 14 turns off the control current I so that a renewed pressure increase in the working medium of this brake line 5 can take place after a predetermined time function predetermined with respect to the magnetic valve.

While I have shown and described only two embodiments in accordance with the present invention, it is understood that the same is not limited thereto but is susceptible of numerous changes and modifications as known to a person skilled in the art, and I therefore do not wish to be limited to the details shown and described herein, but intend to cover all such changes as are within the scope of those skilled in the art.

I claim:

1. An installation for preventing the locking of at least one wheel of a vehicle during braking, comprising a control installation controlled by the wheel which, during locking of the wheel, actuates valve means for reducing the pressure of a working medium actuating the brake, the wheel being provided with tooth means whose pitch corresponds to the distance between the poles of U-shaped magnet means arranged in a magnetic wheel means at a spacing from the tooth means in such a manner that the alternately following poles of the magnetic means correspond to the pitch of the tooth means, wherein a rotating mass is coupled to the magnetic wheel means which is so supported that, during the locking of the wheel, the rotating mass leads the magnetic wheel means and actuates switch means in the control installation and connected with the valve means.

2. An installation according to claim 1, wherein said tooth means are provided a brake drum of the wheel.

3. An installation for preventing the locking of one or several wheels of a vehicle during braking which includes a control installation controlled by a wheel which during locking of a wheel actuates a valve means that reduces the pressure of the working medium actuating the brake, magnetic pickup means at a respective wheel and operatively connected with an input of the control installation to control the latter dependence on the rotation of the wheel, the wheel being provided with tooth means whose pitch corresponds to the distance between the poles of at least one magnetic means arranged at a distance to the wheel and operatively connected to the control installation, and a rotating mass being coupled to magnetic wheel means which is so supported that during locking of the wheel, the rotating mass leads the magnetic wheel means and thereby actuates a switch means in the control installation and connected with the valve means.